Dec. 4, 1956 H. H. VAN ABBE ET AL 2,773,178

RADIO RECEIVING CIRCUIT FOR FREQUENCY MODULATION AND AMPLITUDE MODULATION BANDS

Filed Sept. 10, 1952

INVENTORS

HENRI HERMAN VAN ABBE

ABRAHAM GEERTRUDAS WILHELMUS UITJENS

BY

AGENT

United States Patent Office 2,773,178

Patented Dec. 4, 1956

2,773,178

RADIO RECEIVING CIRCUIT FOR FREQUENCY MODULATION AND AMPLITUDE MODULATION BANDS

Henri Herman van Abbe and Abraham Geertrudas Wilhelmus Uitjens, Eindhoven, Netherlands, assignors to Hartford National Bank and Trust Company, Hartford, Conn., as trustee Application September 10, 1952, Serial No. 308,871

Claims priority, application Netherlands September 17, 1951

1 Claim. (Cl. 250—20)

This invention relates to radio receiving circuits for frequency modulation or for both frequency modulation (FM) and amplitude modulation (AM) with the use of combination tubes.

It has heretofore been suggested to provide a frequency modulation receiving circuit employing for the high and intermediate frequency stages, two tubes each having two sections in which one section has a single grid and the other section has a plurality of grids, for example, two triode-heptode tubes, the heptode of the first tube being connected as a high-frequency amplifier, the triode of the first tube as the self-oscillating mixer and the heptode of the second tube as the intermediate frequency amplifier. The remaining triode of the second tube is used, for example, as the low-frequency amplifier.

Tests on which the invention is based revealed that this circuit has a disadvantage in that a local oscillation is produced by the self-oscillating mixing triode of the first tube and by reason of stray couplings between the triode and the heptode part of the tube is fed to the antenna, which is connected to a control grid of the heptode, thus giving rise to undesirable irradiation of this local oscillation. This undesirable irradiation could be avoided by screening the triode section of the first tube from the heptode section by means of a conductive screen but this is comparatively costly.

The principal object of the invention is to provide an improved radio receiving circuit employing combination tubes.

The invention avoids the above-mentioned comparatively expensive screening. It is based on recognition of the fact that use may be made of the shielding screening which with radio tubes are usually incorporated in the envelope or surrounding it. According to the invention, for receiving frequency-modulated oscillations, one section, more particularly, the multi-grid tube section of the first tube is connected as a high-frequency amplifier, one section more particularly, the one-grid tube section of the second tube, is connected as a self-oscillating mixer and the other section, more particularly the multi-grid valve section of the second tube, is connected as an intermediate frequency amplifier. For receiving amplitude-modulated oscillations, preferably the one-grid valve section of the first tube is connected as the local oscillator, the multi-grid valve section of the second tube is connected as the mixer and at least the one-grid tube section of the second tube usually fulfills no further function so that on switching over from FM to AM reception the chance of undesirable couplings is lessened.

In order that the invention may be clearly understood and readily carried into effect, it will now be described in detail with reference to the accompanying drawing, in which.

Figure 1:
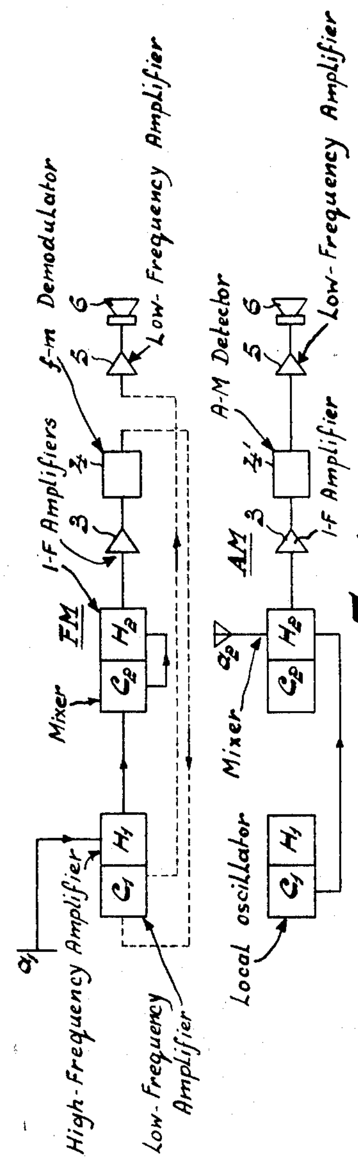
Fig. 1 is a block diagram of a receiver according to the invention.

Referring to Fig. 1, the upper part FM of the figure shows in block diagram the arrangement of the radio receiver when receiving frequency-modulated oscillations. The signal received in a dipole antenna $a_1$ is fed to a high-frequency amplifier, which for this purpose, is constituted by the heptode section $H_1$ of a first combination tube $C_1H_1$. According to the invention, in contradistinction to the circuit already known, in which the triode section $C_1$ of this tube is included as a self-oscillating mixer, in which case it has been found that undesirable radiation of the local oscillations produced by this triode is transmitted to the antenna $a_1$, the triode section $C_2$ of the second combination tube $C_2H_2$ is adapted to operate as a self-oscillating mixer and the screening arranged in the envelope of the tubes $C_1H_1$ and $C_2H_2$ or surrounding it avoids undesirable radiation to the antenna.

The high-frequency output oscillations of the heptode $H_1$ are fed to the triode $C_2$ whose intermediate frequency output oscillations are amplified in the heptode section $H_2$ of the second combination tube $C_2H_2$, which section is connected as the intermediate frequency amplifier stage. The resulting intermediate frequency oscillations are amplified in the stage 3 and demodulated in the stage 4. The second section $C_1$ of the first combination tube $C_1H_1$ is capable of acting as a low-frequency amplifier, as shown by the broken lines, after which a one- or two-tube amplifier 5 and a loudspeaker 6 follow.

In the lower part AM of Fig. 1, the receiver is shown to comprise the same tubes, which, however, are connected for the reception of amplitude-modulated oscillations. The amplitude-modulated signal fed into an antenna $a_2$ is fed to the heptode section $H_2$ of the second combination tube $C_2H_2$, which acts as a multiplicative mixing tube, the local oscillations required for this purpose being produced with the use of the triode section $C_1$ of the first combination tube $C_1H_1$. This prevents the relatively long leads for the switches effecting change-over from frequency modulation to amplitude modulation reception from being required to lead the radio frequency frequency-modulated oscillations and thus greatly lessens the chance of stray couplings.

Figure 2:
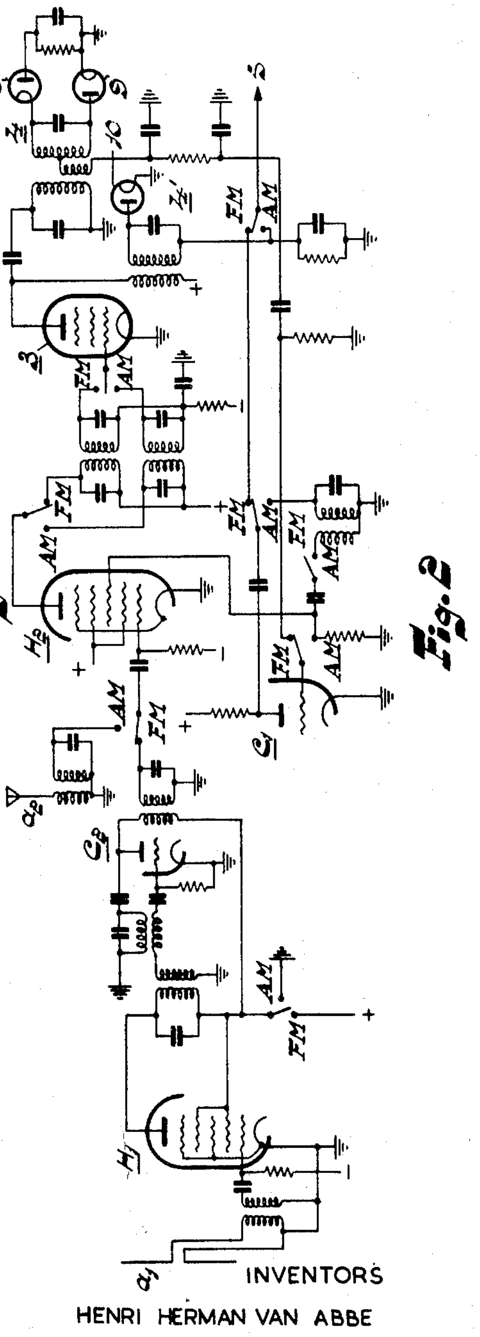
Fig. 2 shows, by way of example, a schematic diagram of a practical embodiment of the receiver.

Fig. 2, which makes use of like reference characters as Fig. 1, shows, by way of example, one embodiment of the high-frequency intermediate frequency and detector part of a combined FM-AM receiver, the FM-position of the switches being associated with frequency modulation reception and the AM-position with amplitude modulation reception. In case of AM-reception, the tube sections $H_1$ and $C_2$ are rendered inoperative by disconnection of the operating voltage. The tube section $C_1$ acts as a low-frequency amplifier in the case of FM-reception and as a local oscillator in the case of AM-reception. The resulting low-frequency oscillations are fed to the amplifier 5 in the direction of the arrow. The amplifier may be constituted, if desired by a triode amplifier followed by an output stage, which triode amplifier can be united with advantage in one envelope with the rectifiers 8 and 9 of the frequency detector 4 (ratio detector) and 10 of the amplifier detector 4'.

The measure according to the invention permits, while using the same tubes, of reducing the undesirable radiation to only a few millivolts, that is to say, by a factor 70. As an alternative, it may be used for other types of combination tubes, such as a triode-hexode or a duo-triode.

What we claim is:

A radio receiving circuit for selectively receiving frequency modulated signals and amplitude modulated signals, comprising a first shielded combination tube having a triode section and a multi-grid section, a second shielded combination tube having a triode section and a multi-grid section, and switching means for selectively connecting said tubes in a first arrangement for receiving said frequency modulated signals and a second arrangement for receiving said amplitude modulated signals, said first arrangement comprising means for connecting the multi-grid section of said first tube as a high-frequency amplifier stage to amplify said frequency modulated signals, means for connecting the triode section of said second tube as a self-oscillating mixer stage coupled to receive the output signal of said amplifier stage, and means for connecting the multi-grid section of said second tube as an intermediate frequency amplifier stage coupled to receive the output signal of said mixer stage, said second arrangement comprising means for connecting the multi-grid section of said second tube as a mixer stage, means for feeding said amplitude modulated signals to the last-named mixer stage, and means for connecting the triode section of said first tube as a local oscillator coupled to said last-named mixer stage.

References Cited in the file of this patent

UNITED STATES PATENTS

| | | |
|---|---|---|
| 2,299,059 | Sandor | Oct. 13, 1942 |
| 2,383,345 | Seiler | Aug. 21, 1945 |
| 2,451,584 | Stone | Oct. 19, 1948 |

FOREIGN PATENTS

| | | |
|---|---|---|
| 512,062 | Belgium | June 30, 1952 |